United States Patent
Rodesch et al.

[11] Patent Number: 5,938,529
[45] Date of Patent: Aug. 17, 1999

[54] REEL TYPE SLOT MACHINE HAVING STEPPER MOTOR MONITORING SYSTEM

[75] Inventors: Gregory L. Rodesch, Oceanside; Dale F. Rodesch, San Diego, both of Calif.

[73] Assignee: Unislot, Inc., Escondido, Calif.

[21] Appl. No.: 08/818,850

[22] Filed: Mar. 17, 1997

[51] Int. Cl.⁶ .............................. A63F 9/22; G05B 19/40
[52] U.S. Cl. ................. 463/20; 273/143 R; 318/685
[58] Field of Search ................. 463/20, 18, 17, 463/16, 29; 273/143 R; 318/685, 696

[56] References Cited

U.S. PATENT DOCUMENTS

| | | | |
|---|---|---|---|
| 3,586,953 | 6/1971 | Markhanen | 318/685 |
| 3,684,290 | 8/1972 | Wayne | 273/143 C |
| 3,838,258 | 9/1974 | Logan | 235/151.11 |
| 3,910,582 | 10/1975 | Richards | 273/143 R |
| 3,913,922 | 10/1975 | Richards et al. | 273/143 R |
| 4,074,258 | 2/1978 | Dorë et al. | 340/347 P |
| 4,282,471 | 8/1981 | Budniak et al. | 318/685 |
| 4,282,472 | 8/1981 | Martin | 318/696 |
| 4,660,833 | 4/1987 | Dickinson et al. | 273/143 R |
| 4,687,981 | 8/1987 | Okada | 318/696 |
| 4,911,449 | 3/1990 | Dickinson et al. | 273/143 R |
| 4,912,389 | 3/1990 | Eguchi | 318/694 |
| 5,058,893 | 10/1991 | Dickinson et al. | 273/143 R |
| 5,154,421 | 10/1992 | Hamano | 273/143 R |
| 5,219,167 | 6/1993 | Hamano | 273/143 R |

FOREIGN PATENT DOCUMENTS

| | | |
|---|---|---|
| 1579731 | 7/1972 | United Kingdom . |
| 2065352 | 6/1981 | United Kingdom . |

*Primary Examiner*—Michael O'Neil
*Attorney, Agent, or Firm*—Lockwood,Alex,FitzGibbon & Cummings

[57] ABSTRACT

A reel-type slot machine includes a microprocessor driven game control circuit for randomly determining a game result and three reel assemblies each including a symbol-bearing reel driven by a stepper motor for displaying the game results. The stepper motors each include a permanent magnet rotor and four stator windings which respond to quadrature phase motor drive signals generated by the game control circuit to incrementally rotate the reels. A reel motion monitoring circuit senses back EMF on each stator winding to generate an error signal which inhibits play in the event a motor fails to respond to an applied drive signal or a reel is moved by tampering.

17 Claims, 10 Drawing Sheets

REEL TYPE SLOT MACHINE HAVING STEPPER MOTOR MONITORING SYSTEM

BACKGROUND OF THE INVENTION

The present invention relates to reel-type slot machines, and more particularly to a slot machine having stepper motor-driven symbol bearing reels, which offers improved protection against false displays such as may result from malfunctions of the stepper motor or tampering by a player.

In recent years reel-type slot machines have evolved from mechanical type machines wherein mechanical clutches were relied on to stop the reels at random locations, to electronic machines wherein a microprocessor randomly selects the game result, and the reels are driven to positions wherein symbols on the reels display the selected result. The present invention is directed to an improvement for such a machine.

In electronic reel type slot machines the reels are typically positioned by stepper motors, which may be contained in removable modules within the machine. The stepper motors respond to applied signals which are progressively phase-shifted relative to each other such that the stepper motor is caused to turn one element of rotation for each progression of the phase signals.

The phase signals are typically generated in a driver circuit, which responds to applied motor stepping pulses to advance the reel in increments. The motor stepping pulses are generated by a microprocessor, a predetermined number of pulses being generated to cause the motor to be incremented to a selected stopping position wherein the game result is displayed. In practice, the stopping position is determined by either counting the number of motor pulses occurring after a "home" marker on the reel has passed a fixed sensor, or by counting markers provided on the reel for each display position after the home marker has passed.

In either case, the potential exists for the reel to not be accurately positioned by the stepper pulses. This can occur if the motor fails to increment in response to an applied drive signal, or if the reel is mechanically retarded or advanced, as by tampering during or after application of the drive signals.

The present invention is directed to a reel-type slot machine having a display system wherein the movement of the reels is continuously monitored to detect such slipping or tampering, and wherein in such event, an alarm is sounded and further play is inhibited.

In particular, in the slot machine of the present invention monitoring is accomplished by sensing back-EMF on the stepper motor stator windings, and generating an alarm signal in the event such back-EMF exceeds a predetermined threshold level. The alarm signal is applied to the microprocessor game circuitry to inhibit the payout of a reward and prevent any further play of the slot machine.

Accordingly, it is a general object of the present invention to provide a new and improved reel-type slot machine.

It is a more specific object of the present invention to provide a reel type slot machine having a stepper motor driven display which provides improved protection against malfunctions and tampering.

SUMMARY OF THE INVENTION

The invention is directed to a slot machine comprising a rotatably mounted reel containing a plurality of game symbols, a stepper motor rotatably coupled to the reel, the stepper motor including a magnetic rotor and multiple stator windings, a game control circuit responsive to a play command for randomly picking a game result and generating stepper pulses for causing the motor to position the reel in accordance with the game result, a motor drive circuit responsive to the stepper pulses for applying phase signals to the stator windings whereby the motor is caused to incrementally rotate with each stepper pulse, and monitoring means coupled to at least a portion of the windings and responsive to back EMF signals induced therein for providing an alarm signal in the event the movement of the reel is not in accordance with the stepper pulses.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
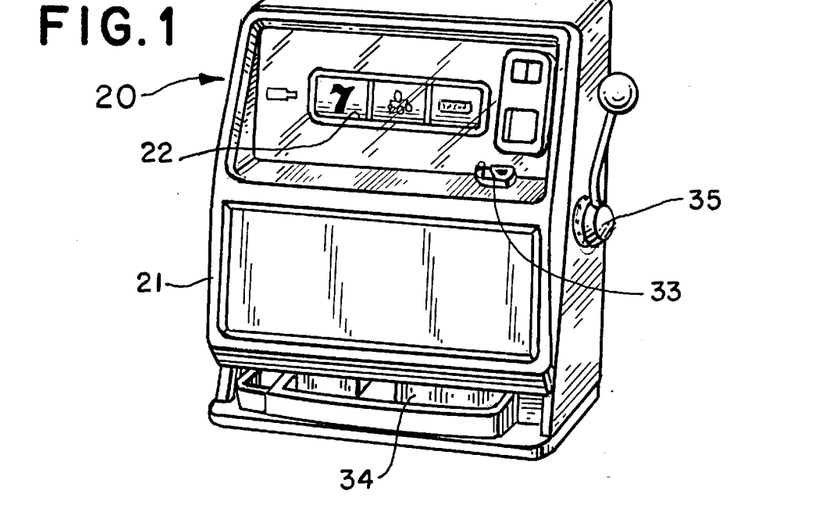
FIG. 1 is a perspective view of a reel-type slot machine constructed in accordance with the invention.
Figure 2:
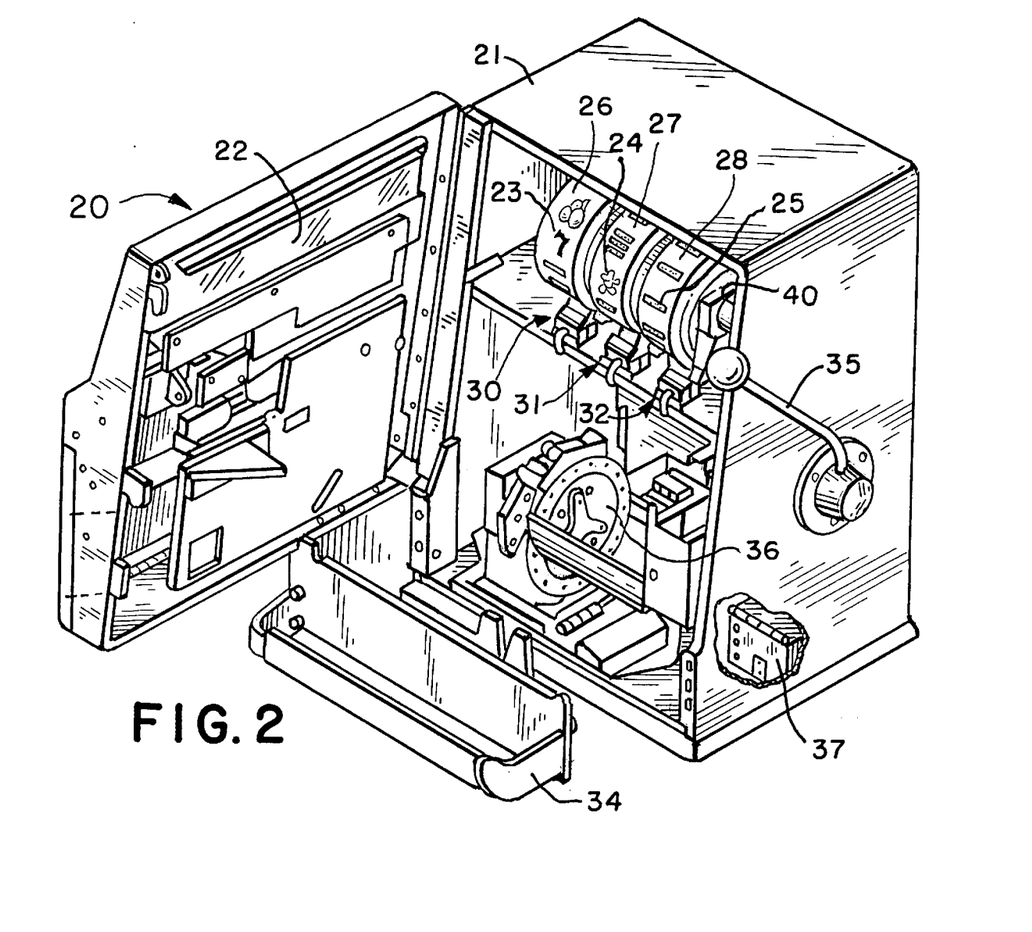
FIG. 2 is a perspective view of the slot machine of FIG. 1 with its cabinet open to show the principal components of the machine.
Figure 3:
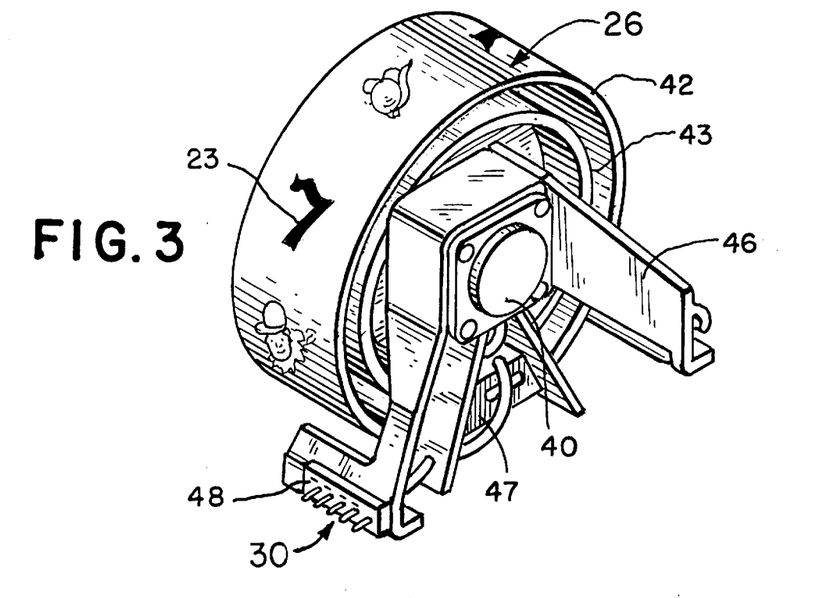
FIG. 3 is a perspective view of one of the removable reel assemblies utilized in the slot machine of FIGS. 1 and 2.

Referring to the drawings, and particularly to FIGS. 1 and 2, a reel-type slot machine 20 constructed in accordance with the invention is seen to include a cabinet 21 having a display window 22. Three game symbols 23–25 contained on respective reels 26–28 (FIG. 2) of individual plug-in reel assemblies 30–32 are visible through the window.

In accordance with conventional design slot machine 20 includes a coin slot 33 (FIG. 1) for receiving coins, a hopper 34 for dispensing coins, and a play handle 35 for initiating game play. Within cabinet 21 slot machine 20 further includes a coin dispensing unit 36 (FIG. 2) of conventional design and an electronic game control module 37 for controlling game operation. As will be described presently, this module among its other control functions provides drive signals to reel assemblies 30–32 to cause reels 26–28 to stop at predetermined positions whereby game symbols appropriate to a game result are displayed through window 22.

Figure 4:
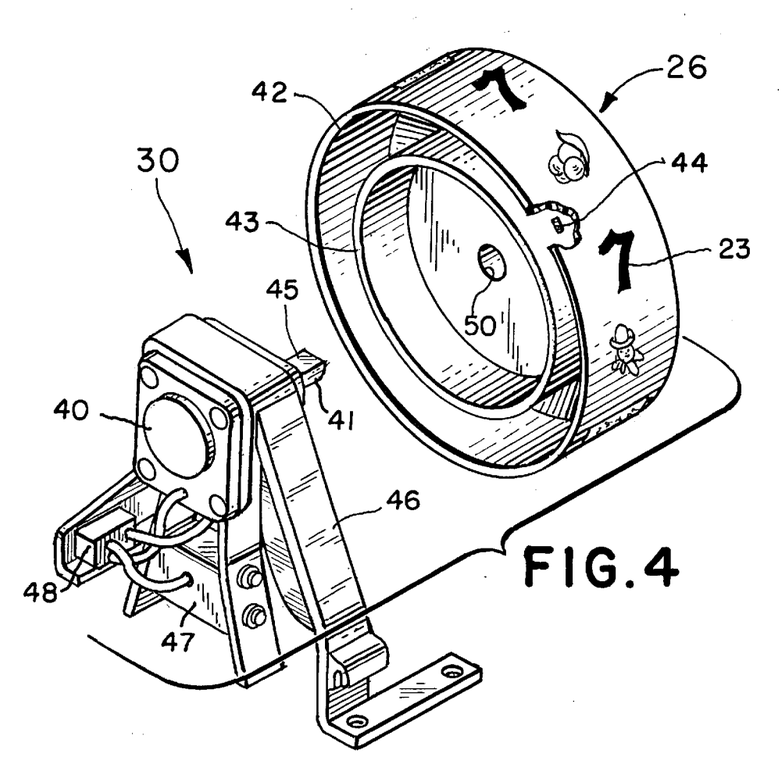
FIG. 4 is an enlarged exploded view of the reel assembly of FIG. 3.
Figure 5:
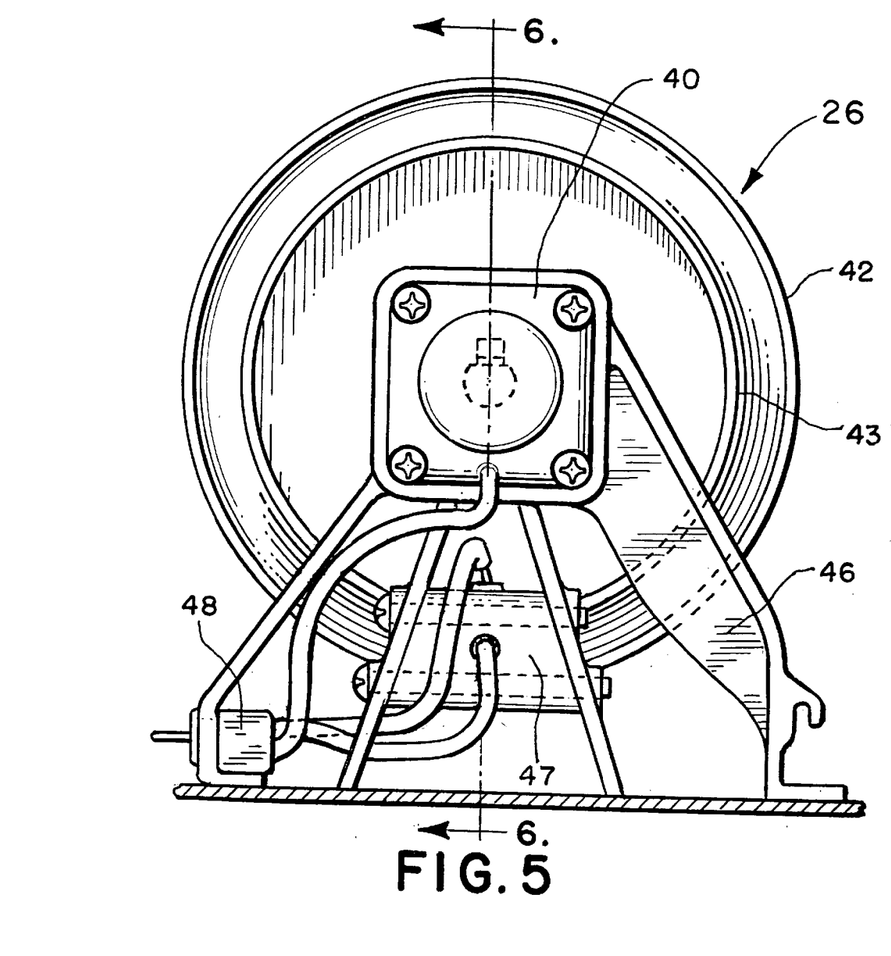
FIG. 5 is an enlarged front view of the reel assembly of FIGS. 3 and 4.
Figure 6:
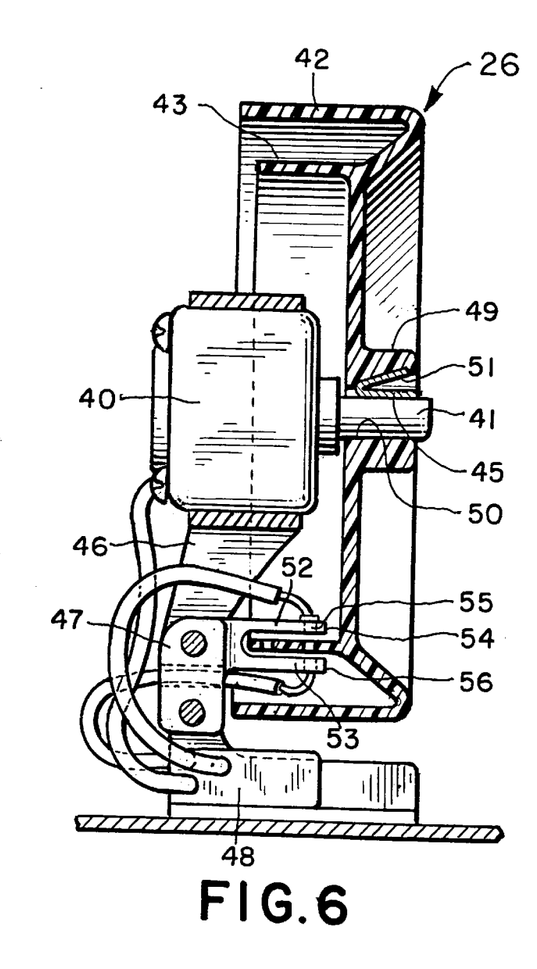
FIG. 6 is a side cross-sectional view of the reel assembly taken along line 6—6 of FIG. 5.

Referring to FIGS. 4–6, reel assembly 30 is seen to include a stepper motor 40 having a shaft 41 on which reel 26 is received. The reel includes an outer portion 42 on which symbols 23 are contained, and an inner portion 43 concentric with the outer portion on which a reference marker 44 in the form of a narrow slit is contained. The two reel portions 42 and 43 are seen to be concentric on shaft 41 and are at a fixed angular position relative to each other. In a preferred form, the entire reel 26 is formed as a single piece which can be conveniently installed on and removed from shaft 41. A flat 45 may be formed on shaft 41 to provide positive rotational coupling between stepper motor 40 and the reel.

A generally A-shaped frame 46 is provided to position motor 40 such that the outer circumference of reel 26 can be seen through window 22 when the reel assembly 30 is installed in cabinet 21. A sensor assembly 47 is provided on frame 46. This sensor operates in conjunction with the inner portion 43 of reel 26 to detect reel position. An electrical connector 48 is provided on one leg of frame 46 to enable electrical connections to be made when the reel assembly is installed in cabinet 21.

As shown in FIG. 6, reel 26 includes a hub portion 49 which is received over shaft 41. An aperture 50 in the hub portion receives motor shaft 41. A spring 51 within the hub portion engages the flat 45 on the shaft to secure the hub on the shaft, and prevent independent reel rotation. Alternatively, a set screw may be provided in the hub portion for the same purpose.

Sensor assembly 47 is seen in FIG. 6 to include two thin projecting fingers 52 and 53 which form a slot 54 within which the inner reel portion 43 is received. The upper finger 52 includes a light source in the form of an LED 55 and the lower portion 53 includes a light detector 56. LED 55 and detector 56 are aligned with reel portion 43 such that "home" marker aperture 44 is caused to pass between the two devices with each full rotation of the reel. In this way, the passage of the "home" position on the reel is sensed, and in this embodiment control circuits 37 count stepper pulses from that time to determine when the reel has reached the desired reel stopping position, at which time it interrupts the stepper pulses.

Figure 7:
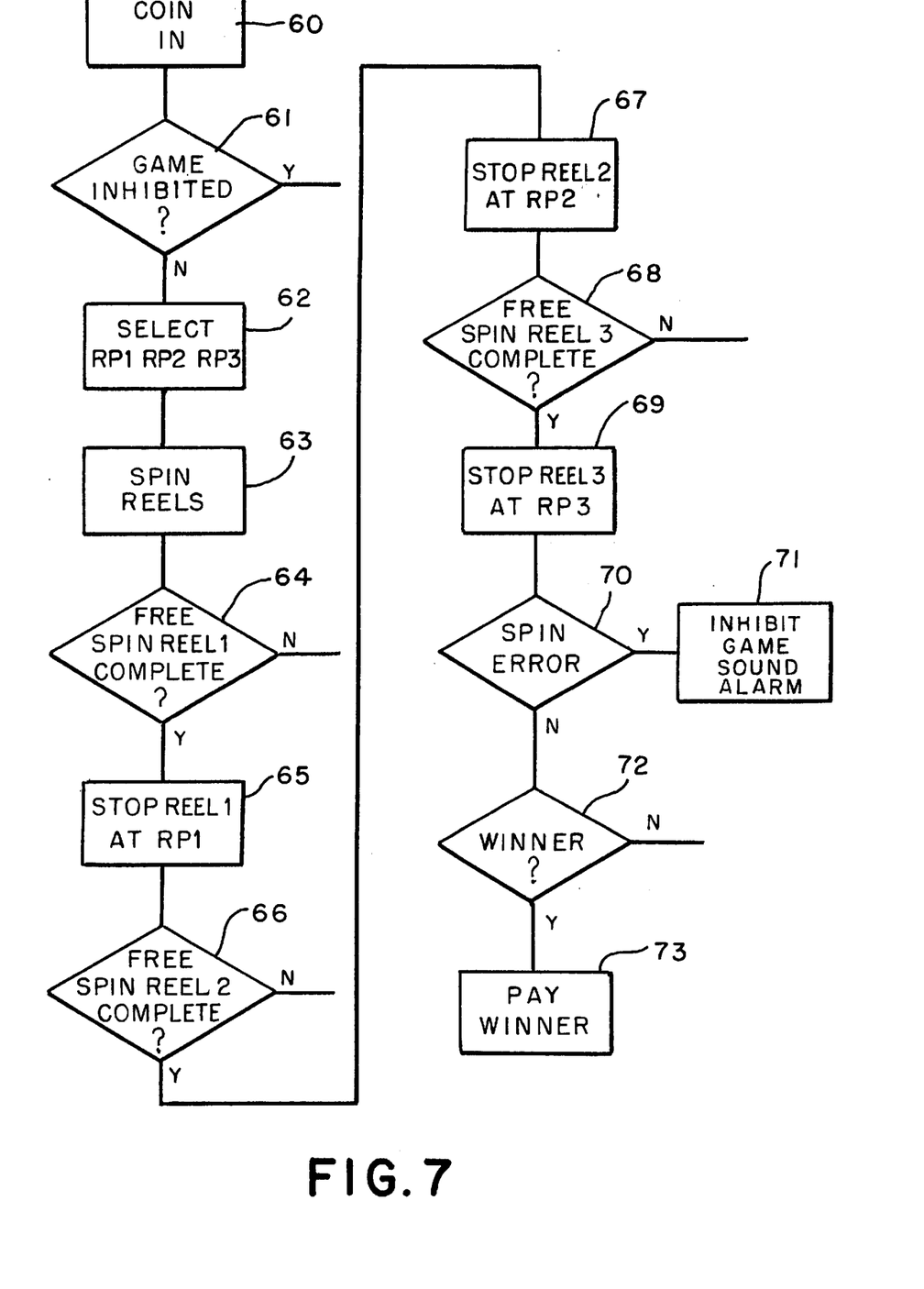
FIG. 7 is a functional block diagram illustrating the operation of the slot machine of FIGS. 1 and 2.

The operation of slot machine 20 is illustrated in FIG. 7. First, at 60 a coin is received. Then, at 61, if the machine has not been inhibited by the reel monitoring system or some other fault, the microprocessor-driven game control circuits 37 at 62 are caused to select three random reel stopping positions RP1, RP2 and RP3. Next, at 63 all three reels are caused to spin. The first reel 26 continues to spin for a first predetermined free spin period, and upon completion of this period at 64 a stopping procedure is initiated at 65 whereby motor pulses are counted following passage of the reference slot 44 at sensor 47 to stop the reel at its intended position. In the meantime the second reel 27 continues to spin, and upon completion of a longer predetermined spin period at 66 a similar stopping procedure is entered into at 67 to cause that reel to stop at its intended position. Similarly, the third reel 28 continues to spin through a still longer predetermined free spin id period at 68 until at 69 another stopping procedure causes it to stop at its intended position.

In accordance with the invention, in the event that a spin error has occurred in the positioning of any one of the three reels, either as a result of the stepper motor slipping or failing to execute one step in response to a stepper pulse, or the reel having been moved in the absence of a stepper pulse, a spin error is recognized at 70, an alarm is sounded and the game is inhibited at 71. In the absence of a spin error, a determination is made at 72 whether the game results constitute a win, and if so the hopper mechanism 36 is actuated to accomplish a payout at 73.

Figure 8:
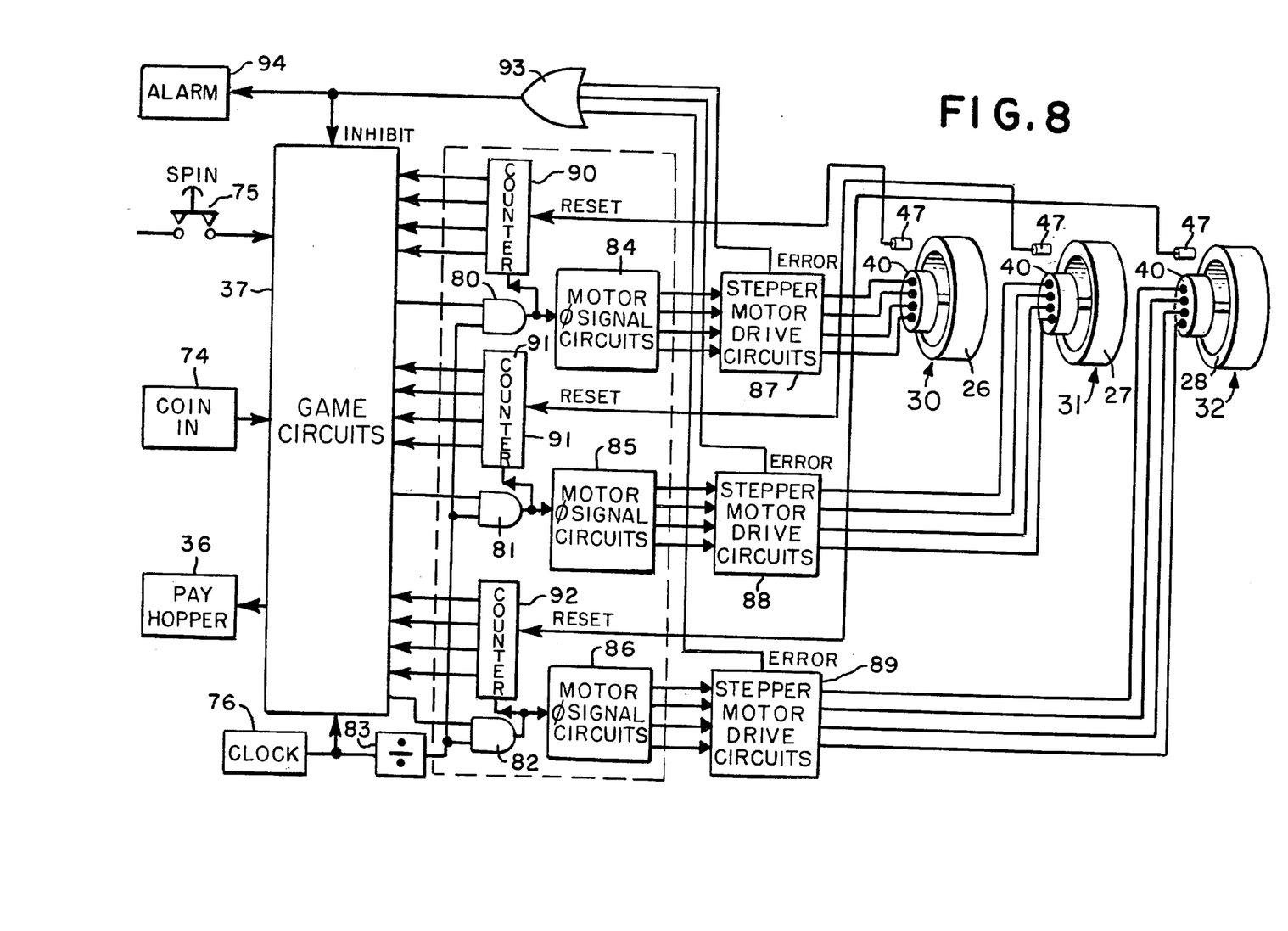
FIG. 8 is a simplified schematic diagram partly in functional form illustrating the primary components of the slot machine of FIGS. 1 and 2.

The interconnection and function of the principal components of slot machine 20 is illustrated in FIG. 8. Game control circuits 37, which typically includes a microprocessor and associated memory and input-output circuits, receives signals from a coin-in detector 74 and a spin switch 75 associated with play arm 35. The microprocessor, utilizing a stored random number generating algorithm, selects a game result which requires that reels 26–28 be stopped at predetermined stopping positions which will display the game results through window 22.

Next, the game circuits, which are driven by a conventional clock 76, provide enabling signals to AND gates 80–82, which allow stepper pulses generated from the clock signal by a divider 83 to be applied to motor phase signal generating circuits 84–86 associated with reel assemblies 30–32, respectively. These circuits provide progressively advanced quadrature phase signals in response to each stepper pulse to stepper motor drive circuits 87–89 associated with reel assemblies 30–32, respectively. The outputs of the drive circuits are applied to the four stator windings of their associated stepper motor in a conventional manner whereby the motor is caused to incrementally rotate with each stepper pulse.

Figure 9:
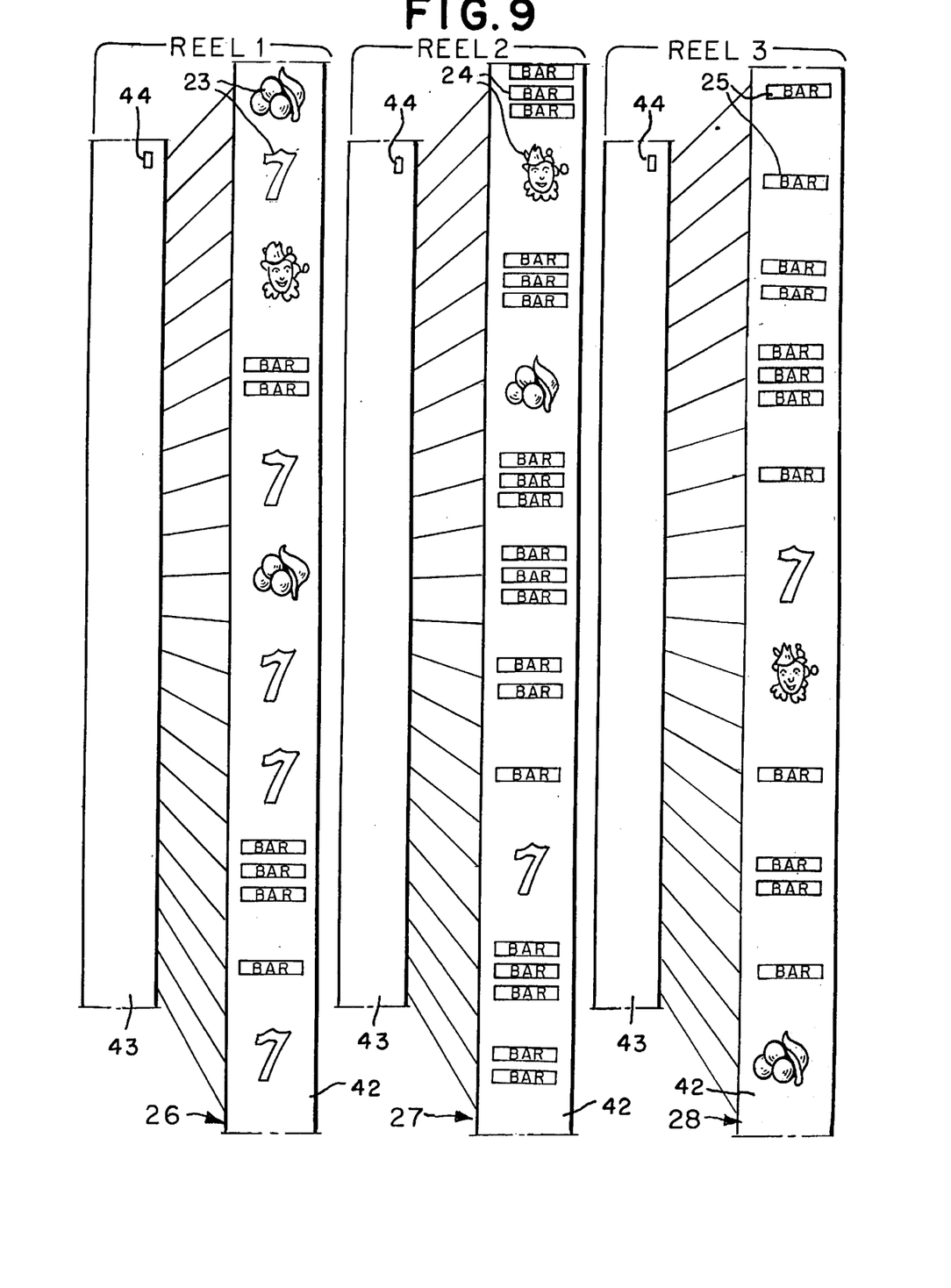
FIG. 9 is a pictoral chart illustrating the arrangement of game symbols and marker indicia on the reels of the slot machine of FIGS. 1 and 2.

To control the stopping position of the reels each stepping pulse applied to a motor is counted in an associated one of counters 90–92. Sensors 47 are provided in association with each reel to sense the passage of the "home" reference slots 44 provided on the three reels, as shown in FIG. 9. The outputs of these sensors reset respective ones of counters 90–92 so that the counters track the reels, the count in each counter always corresponding to the position of its associated reel. The contents of the counters are input to the game circuits wherein after the respective free spin periods they are compared with the desired count (i.e., that count corresponding to the desired reel stopping position referenced to the reel "home" position), so that the enabling signals to gates 80–82 can be interrupted by the game control circuit when appropriate to stop the reels. Although not shown, it will be appreciated that conventional ramp-up and ramp-down procedures, wherein the repetition rate of a predetermined number of stepping pulses is temporarily reduced during starting and stopping of the reels, may be employed by the game control circuits when required. If the game result is a win, an appropriate signal is applied to hopper mechanism 36 to pay out coins.

Each of the stepper motor drive circuits includes, in accordance with the invention, means for detecting false positioning of the associated reel. In the event of such detection, an error signal is coupled to OR gate 93, which causes an alarm 94 to be actuated and the game circuits 37 to be inhibited.

Figure 10:
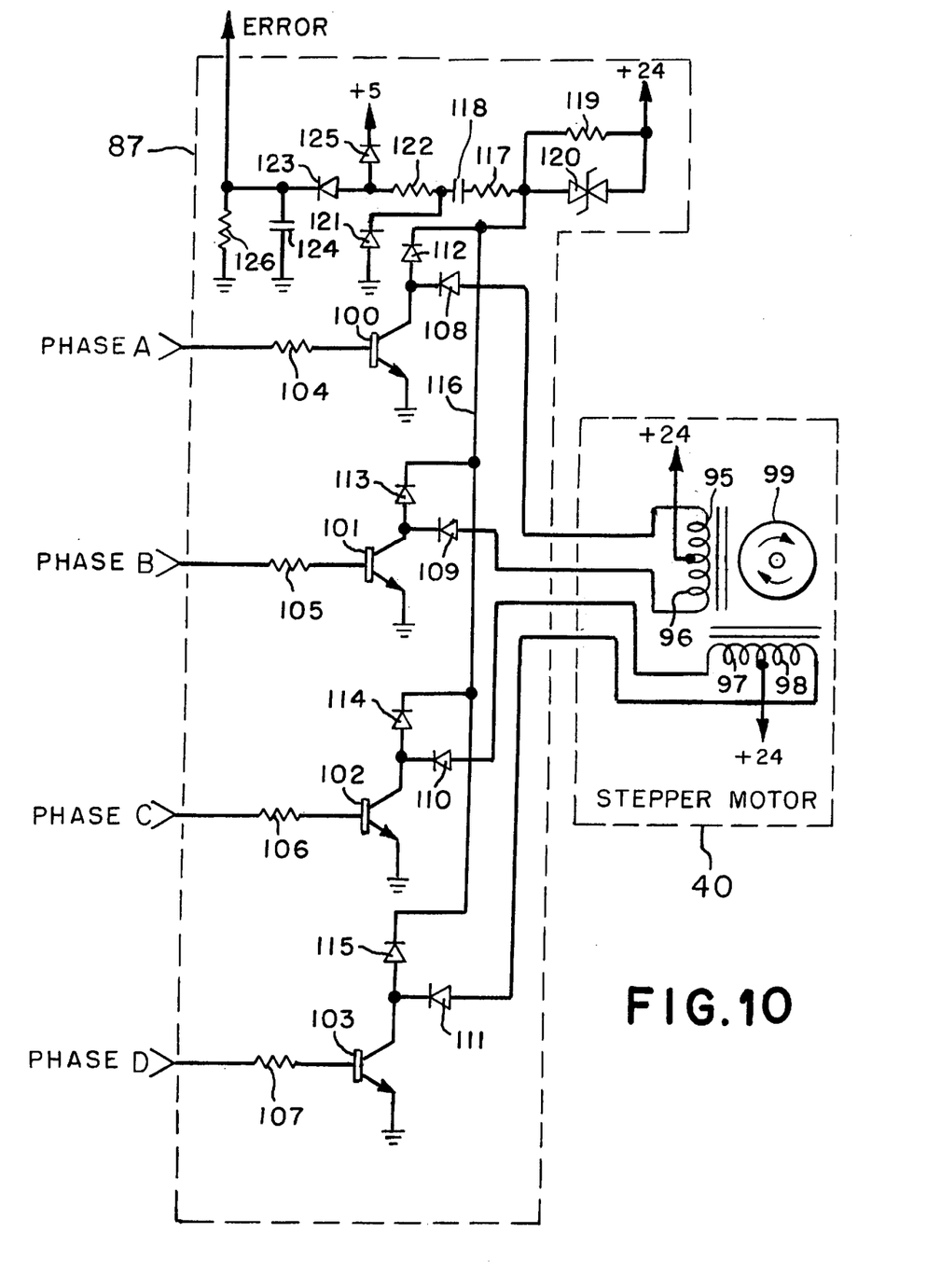
FIG. 10 is a simplified schematic diagram showing the reel monitoring circuitry utilized in conjunction with each reel assembly of the slot machine of FIGS. 1 and 2.

Referring to FIG. 10, the four stepper motors 40 of slot machine 20 conventionally include four stator windings 95–98 in association with a permanent-magnet rotor 99. To cause one increment of rotation of the motor, typically $\frac{1}{400}$ of a turn, the signals applied to the windings are advanced in quadrature phase in a manner well known to the art.

In drive circuits 87, separate output transistors 100–103 are provided to generate relatively high current phase signals for the motor windings. The phase signals from phase signal generating circuits 84–86 are applied to the base electrodes of respective ones of the output transistors through resistors 104–107. The collector electrodes of the transistors are connected to a positive current source through respective diodes 108–111 and respective ones of the stator windings. With this circuit arrangement, transistors 100–103 apply drive signals to windings 95–98 in accordance with the applied phase signals.

In accordance with the invention, the collector electrodes of transistors 100–103 are also connected by respective sensing diodes 112–115 to an error sense line 116. Since diodes 112–115 are connected to transistors 100–103 in opposite polarity to diodes 108–111, only back-EMF generated in windings 95–95 appears on the sense line. Drive signals generated by the output transistors are blocked by the sensing diodes.

Sense line 116 is connected through a current limiting resistor 117 to one terminal of a pulse coupling capacitor 118, and through the parallel combination of a resistor 119 and bi-polar zener diode 120 to the motor current source to provide a discharge path for the coupling capacitor. The other terminal of capacitor 118 is connected to ground through a diode 121, which establishes a positive potential at the capacitor terminal, and through a current limiting resistor 122 and diode 123 to a peak storage capacitor 124. A diode 125 connected between resistors 122 and a +5 volt source limits the peak pulse voltage applied to capacitor 124 to +5 volts. A resistor 126 connected across capacitor 124 serves to discharge the charge holding capacitor following a sensed back-EMF error signal.

The charge developed across capacitor 124 provides an error signal, which when applied through OR gate 93 to game circuits 37, as previously described, sounds an alarm and inhibits further operation of the slot machine.

It will be understood that each of the reel assemblies, except for the symbol make-up of their individual reels 26–28, may be identical in construction and operation. Similarly, each of the three motor drive circuits 87–89 may be identical in structure and operation.

Figure 11:
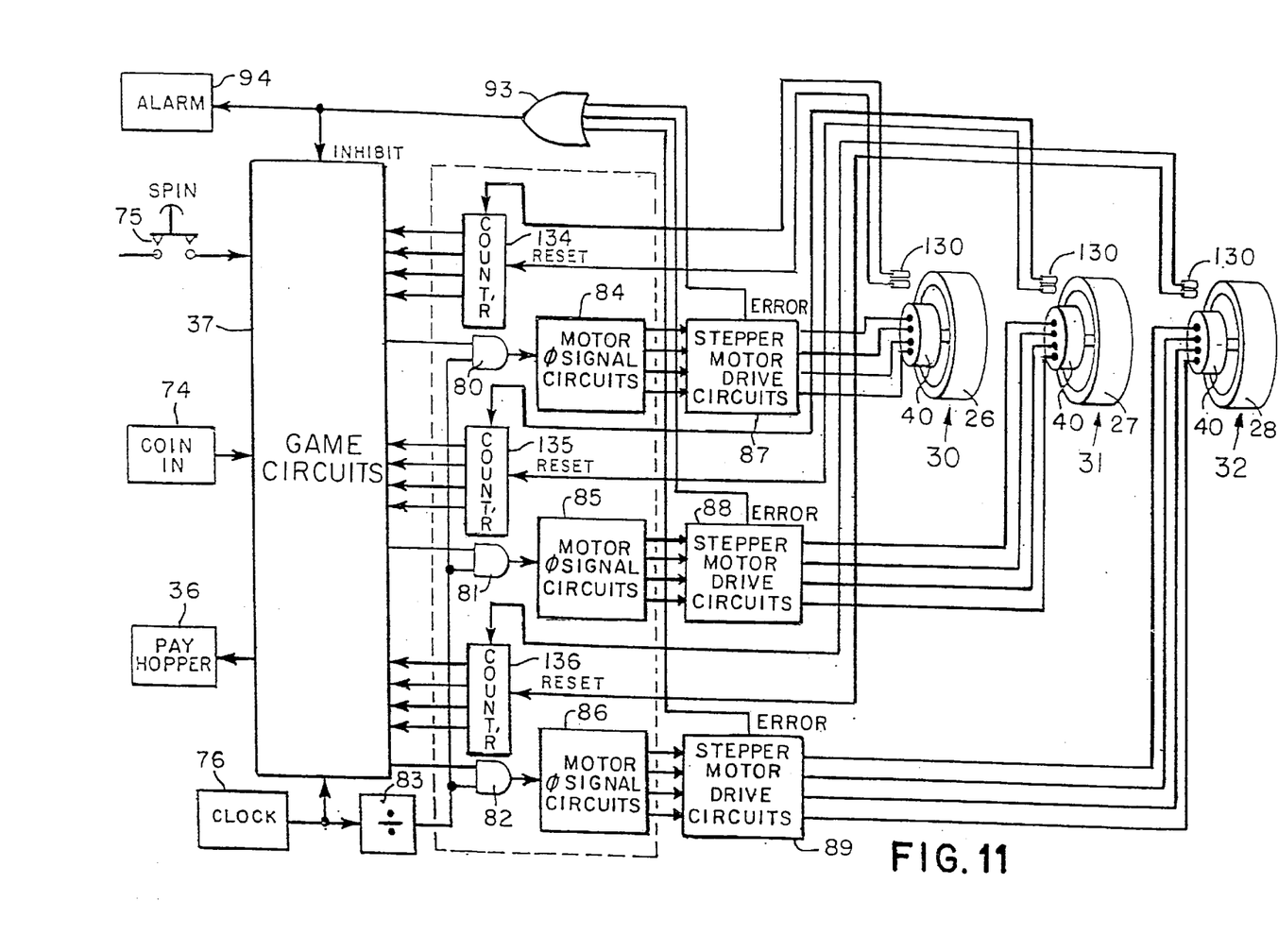
FIG. 11 is a simplified schematic diagram partly in functional form illustrating a slot machine constructed in accordance with an alternative embodiment of the invention.
Figure 12:
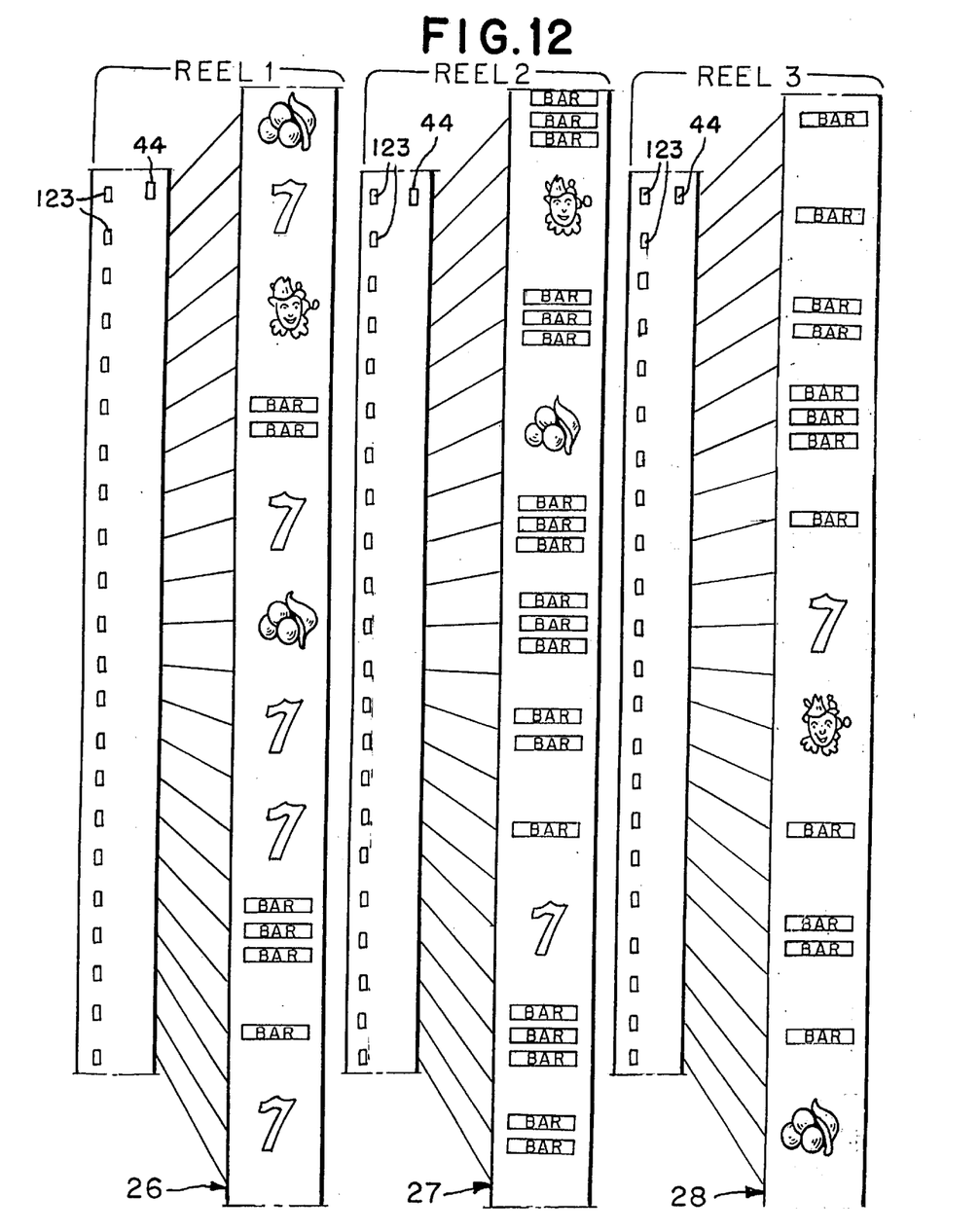
FIG. 12 is a pictoral chart illustrating the arrangement of game symbols and marker indicia on the reels of the slot machine of FIG. 11.
Figure 13:
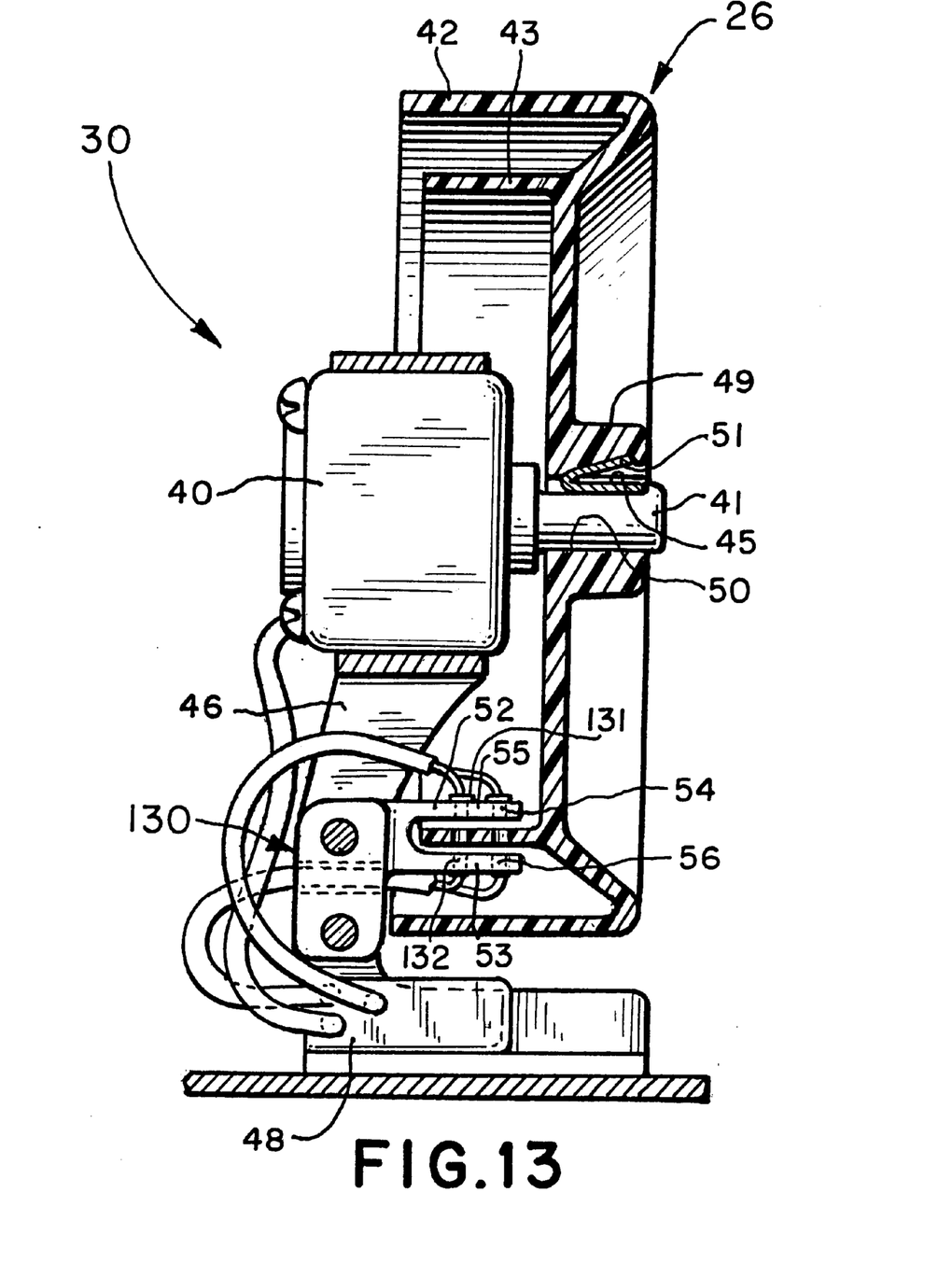
FIG. 13 is a cross sectional view similar to FIG. 6 showing an alternative form of reel movement sensor for use with the embodiment of FIGS. 11 and 12.

While the novel reel monitoring arrangement of the invention has been shown in the context of a slot machine wherein motor stepper pluses are counted to position the reels, it may also be utilized in a slot machine wherein sync pulses derived by a sensor which senses the passage of reel symbol positions are counted instead of motor stepping pulses. In particular, as shown in FIGS. 11 and 13, three sensor assemblies 130 each having an additional LED 131 and photodetector 132 may be provided in association with the three reel assemblies 26–28. A plurality of additional slots 133 is arranged around the inner portion 43 of each reel. These slots are detected by sensor assemblies 130 as the reels turn to generate sync pulses. The sync pulses generated by each reel are counted by respective counters 134–136 (FIG. 11), which are reset each time the "home" position slot 44 of their respective reel passes the sensor.

The counters now track reel symbol positions as the reels turn. Typically, 22 such positions are provided on a reel, eleven displaying game symbols and eleven being blank. However, the error sensing circuits still sense incremental reel positions, typically $\frac{1}{400}$ of a revolution, and therefore remain desirably sensitive to the slightest malfunction or tampering.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A monitored drive apparatus for use in conjunction with a stepper motor having a plurality of stator windings and a magnetic rotor, comprising:

motor drive means responsive to an applied stepper pulses for applying phase signals to said stator windings whereby said motor is caused to incrementally rotate with each stepper pulse; and monitoring means coupled to at least a portion of said stator windings and responsive to back EMF signals induced therein for providing an alarm signal in the event the movement of said rotor is not in accordance with said stepper pulses.

2. A monitored drive apparatus as defined in claim 1 wherein said motor stator comprises a permanent magnet.

3. A display system as defined in claim 1 wherein said stepper motor comprises four stator windings, and said phase signals comprise quadrature signals.

4. A display system as defined in claim 1 wherein said monitoring means comprise a plurality of diodes each connected at one end to a respective one of said stator windings, and at its other end to an integration circuit which provides an output signal in response to changes in back EMF signals derived from said stator windings by said diodes.

5. A display system as defined in claim 1 wherein said monitoring means further include threshold means for providing said alarm signal in the event said integration signal exceeds a predetermined level.

6. A slot machine comprising:

a rotatably mounted reel containing a plurality of game symbols;

a stepper motor rotatably coupled to said reel;

said stepper motor including a magnetic rotor and multiple stator windings;

a game control circuit responsive to a play command for randomly picking a game result and generating stepper pulses for causing said motor to position said reel in accordance with said game result;

a motor drive circuit responsive to said stepper pulses for applying phase signals to said stator windings whereby said motor is caused to incrementally rotate with each stepper pulse; and monitoring means coupled to at least a portion of said windings and responsive to back EMF signals induced therein for providing an alarm signal in the event the movement of said reel is not in accordance with said stepper pulses.

7. A slot machine as defined in claim 6 wherein said motor stator comprises a permanent magnet.

8. A slot machine as defined in claim 6 wherein said stepper motor comprises four stator windings, and said phase signals comprise quadrature signals.

9. A slot machine as defined in claim 6 wherein said monitoring means comprise a plurality of diodes each connected at one end to a respective one of said stator windings and at their other end to an integration circuit which provides an output signal in response to changes in the signals derived from said stator windings by said diodes.

10. A slot machine as defined in claim 9 wherein said monitoring means further include threshold means for providing said alarm signal in the event said integration signal exceeds a predetermined level.

11. A display device for displaying the outcome of a game in a slot machine comprising:

a rotatably mounted reel containing a plurality of game symbols;

a stepper motor rotatably coupled to said reel;

said stepper motor including a magnetic rotor and multiple stator windings;

a motor drive circuit responsive to applied stepper pulses for applying phase signals to said stator windings whereby said motor is caused to incrementally rotate with each stepper pulse; and     monitoring means coupled to at least a portion of said windings and responsive to back EMF signals induced wherein for providing an alarm signal in the event the movement of said reel is not in accordance with said stepper pulses.

12. A display device as defined in claim 11 wherein said motor stator comprises a permanent magnet.

13. A display device as defined in claim 11 wherein said stepper motor comprises four stator windings, and said phase signals comprise quadrature signals.

14. A display device as defined in claim 11 wherein said monitoring means comprise a plurality of diodes each connected at one end to a respective one of said stator windings, and at their other end to an integration circuit which provides an output signal in response to changes in the signals derived from said stator windings by said diodes.

15. A display device as defined in claim 11 wherein said monitoring means further include threshold means for providing said alarm signal in the event said integration signal exceeds a predetermined level.

16. A display device for displaying the outcome of a game in a slot machine comprising:

a rotatably mounted reel containing a plurality of game symbols;

a stepper motor rotatably coupled to said reels;

said stepper motor including a magnetic rotor and four stator windings;

motor drive means responsive to an applied stepper pulse for applying quadrature phase signals to said stator windings whereby said motor is caused to incrementally rotate with each stepper pulse; and     monitoring means comprising a plurality of diodes each connected between a respective one of said stator windings and an integrating circuit for providing an alarm signal in the event said rotor does not incrementally rotate in accordance with said stepper pulses.

17. A display device as defined in claim 16 wherein said monitoring means further include threshold means for providing said alarm signal in the event said integration signal exceeds a predetermined level.

\* \* \* \* \*